United States Patent
Gilbert

(10) Patent No.: US 11,016,457 B1
(45) Date of Patent: May 25, 2021

(54) SUPERVISORY CONTROL AND DATA ACQUISITION (SCADA) SYSTEM FOR USE WITH SCADA DEVICES HAVING DISPARATE COMMUNICATION TECHNOLOGIES

(71) Applicant: zdSCADA, LP., Tyler, TX (US)

(72) Inventor: Vernon Paul Gilbert, Tyler, TX (US)

(73) Assignee: zdSCADA, LP, Tyler, TX (US)

( * ) Notice: Subject to any disclaimer, the term of this patent is extended or adjusted under 35 U.S.C. 154(b) by 15 days.

(21) Appl. No.: 16/516,899

(22) Filed: Jul. 19, 2019

(51) Int. Cl.
*G05B 19/042* (2006.01)
*G06F 13/20* (2006.01)

(52) U.S. Cl.
CPC .......... *G05B 19/042* (2013.01); *G06F 13/20* (2013.01); *G05B 2219/24215* (2013.01); *G06F 2213/40* (2013.01)

(58) Field of Classification Search
CPC ........ G05B 19/042; G05B 2219/24215; G06F 13/20; G06F 2213/40; H04L 67/14; H04L 29/06; H04W 76/00
See application file for complete search history.

(56) References Cited

U.S. PATENT DOCUMENTS

| | | | |
|---|---|---|---|
| 5,490,134 A * | 2/1996 | Fernandes | H04L 29/06 340/3.1 |
| 6,032,154 A * | 2/2000 | Coleman | G06F 16/252 |
| 6,067,477 A * | 5/2000 | Wewalaarachchi | G05B 19/418 700/83 |
| 6,628,992 B2 | 9/2003 | Osburn, III | |
| 6,950,851 B2 | 9/2005 | Osburn, III | |
| 6,961,753 B1 | 11/2005 | Osburn, III | |
| 7,073,182 B1 | 7/2006 | Osburn, III | |
| 7,587,481 B1 | 9/2009 | Osburn, III | |
| 7,646,298 B1 | 1/2010 | Osburn, III et al. | |
| 7,673,337 B1 | 3/2010 | Osburn, III et al. | |
| 7,673,338 B1 | 3/2010 | Osburn, III et al. | |
| 7,725,248 B2 | 5/2010 | Hagel et al. | |
| 7,747,710 B1 | 6/2010 | Osburn, III et al. | |

(Continued)

*Primary Examiner* — Darrin D Dunn
(74) *Attorney, Agent, or Firm* — Gerard E. Moy

(57) ABSTRACT

A supervisory control and data acquisition (SCADA) system includes an input/output (I/O) management system in communication with a SCADA application and multiple SCADA devices. The I/O management system is configured to receive multiple request messages, and for each of the messages, forward the request message to a device driver associated with the SCADA device, and establish an asynchronous connection for communicating with the SCADA device. The I/O management system then receives request message data associated with the request message from the device driver, and forwards the request message data to the SCADA device through the asynchronous connection. When response message data is received from the SCADA device, the I/O management system forwards the response message data to the device driver for generating a response message. When response message is received from the device driver, the I/O management system forwards the response message to the SCADA application. The request message data is transmitted independently of when the request message data associated with each of the other request messages are transmitted.

17 Claims, 7 Drawing Sheets

(56) References Cited

U.S. PATENT DOCUMENTS

| | | | |
|---|---|---|---|
| 8,219,214 B1 * | 7/2012 | Mimlitz | G05B 15/02 |
| | | | 700/9 |
| 8,301,386 B1 | 10/2012 | Redmond et al. | |
| 8,316,232 B1 | 11/2012 | Osburn, III | |
| 8,364,950 B1 | 1/2013 | Osburn, III | |
| 8,694,770 B1 | 4/2014 | Osburn, III | |
| 8,898,481 B1 | 11/2014 | Osburn, III et al. | |
| 8,935,523 B1 | 1/2015 | Osburn, III | |
| 8,966,117 B1 | 2/2015 | Osburn, III | |
| 9,100,318 B1 | 8/2015 | Osburn, III | |
| 9,306,946 B1 | 4/2016 | Osburn | |
| 10,248,601 B2 * | 4/2019 | McLaughlin | G06F 13/4027 |
| 2006/0240818 A1 * | 10/2006 | McCoy | E21B 47/008 |
| | | | 455/430 |
| 2007/0280285 A1 * | 12/2007 | Vanderah | H04L 12/66 |
| | | | 370/466 |
| 2010/0064297 A1 * | 3/2010 | Doll | H04L 12/403 |
| | | | 719/315 |
| 2012/0310558 A1 * | 12/2012 | Taft | G06Q 30/00 |
| | | | 702/61 |
| 2013/0053986 A1 * | 2/2013 | Goose | G05B 19/4183 |
| | | | 700/9 |
| 2013/0282144 A1 * | 10/2013 | Cabello Medina | H04L 65/1069 |
| | | | 700/9 |
| 2013/0289749 A1 * | 10/2013 | Mody | G05B 19/0426 |
| | | | 700/83 |
| 2014/0236318 A1 * | 8/2014 | Esposito | G05B 19/0423 |
| | | | 700/79 |
| 2015/0347935 A1 * | 12/2015 | Standing | H04L 67/10 |
| | | | 705/7.27 |
| 2015/0370235 A1 * | 12/2015 | Lloyd | G05B 19/048 |
| | | | 700/79 |
| 2016/0099841 A1 * | 4/2016 | Tiwari | H04L 41/0806 |
| | | | 370/255 |
| 2018/0026942 A1 * | 1/2018 | De Ligt | H04L 67/42 |
| | | | 709/245 |
| 2018/0143961 A1 * | 5/2018 | Thomas | H04L 65/4015 |
| 2018/0210430 A1 * | 7/2018 | Balduf | G05B 19/4186 |
| 2018/0234260 A1 * | 8/2018 | McLaughlin | H04L 67/10 |
| 2018/0316762 A1 * | 11/2018 | Matsumoto | H04L 43/106 |
| 2018/0337948 A1 * | 11/2018 | Chu | H04L 69/08 |
| 2019/0025807 A1 * | 1/2019 | Kobuchi | G05B 23/0235 |
| 2019/0372977 A1 * | 12/2019 | Ben-David | H04L 12/2818 |
| 2020/0092313 A1 * | 3/2020 | Yamaguchi | H04L 63/0245 |
| 2020/0252288 A1 * | 8/2020 | Al-Yousef | H04L 63/101 |
| 2020/0337558 A1 * | 10/2020 | Lindeman | A61B 5/0022 |

\* cited by examiner

SUPERVISORY CONTROL AND DATA ACQUISITION (SCADA) SYSTEM FOR USE WITH SCADA DEVICES HAVING DISPARATE COMMUNICATION TECHNOLOGIES

TECHNICAL FIELD

Aspects of the present disclosure relate to computing devices and, in particular, to a supervisory control and data acquisition (SCADA) system for use with SCADA devices having disparate communication technologies.

BACKGROUND

Supervisory control and data acquisition (SCADA) systems typically involve distributed measurement and control systems for industrial processes. For example, SCADA systems may be used to monitor and/or control chemical, physical or transport processes, to control electric power distribution and generation, gas and oil pipelines, and other distributed processes. A SCADA system typically includes one or more SCADA devices for obtaining parametric data associated with the industrial process, an input/output (I/O) management system (e.g., SCADA hub) for monitoring and controlling the various SCADA devices, and one or more connections from the various sites to the SCADA controller. The I/O management system may also be equipped with a human machine interface (HMI) that presents information about the industrial process to a human operator, and through which the human operator controls the industrial process by adjusting one or more set points of the industrial process as required.

Each SCADA device may include one or more sensors for gathering data, and/or field instrumentation for affecting some aspect of the industrial process. Examples of conventional sensors include sensors for monitoring the temperature, pressure, and/or flow rate of a gas or fluid. Exemplary control instrumentation typically includes switches, valves, actuators, servos, step motors, and the like. Data observed from the various sensors is provided to the SCADA controller, which in turn, may process the data and generate control signals that can be used to alter the controlled process via control instrumentation.

SUMMARY

According to one aspect of the present disclosure, a supervisory control and data acquisition (SCADA) system includes an input/output (I/O) management system in communication with a SCADA application and multiple SCADA devices. The I/O management system is configured to receive multiple request messages, and for each of the messages, forward the request message to a device driver associated with the SCADA device, and establish an asynchronous connection for communicating with the SCADA device. The I/O management system then receives request message data associated with the request message from the device driver, and forwards the request message data to the SCADA device through the asynchronous connection. When response message data is received from the SCADA device, the I/O management system forwards the response message data to the device driver for generating a response message. When response message is received from the device driver, the I/O management system forwards the response message to the SCADA application. The request message data is transmitted independently of when the request message data associated with each of the other request messages are transmitted.

According to another aspect of the present disclosure, a method includes receiving multiple request messages each associated with corresponding ones of the plurality of supervisory control and data acquisition (SCADA) devices from a SCADA application. For each of the received request messages, the method forwards the request message to a device driver associated with the SCADA device, and establishes an asynchronous connection for communicating with the SCADA device. The method further receives request message data associated with the request message from the device driver, and forwards the request message data to the SCADA device through the asynchronous connection. When response message data is received from the SCADA device the method forwards the response message data to the device driver in which the device driver generates a response message using the response message data. When the generated response message is received from the device driver, the method forwards the response message to the SCADA application. The request message data is transmitted independently of when the request message data associated with each of the other request messages are transmitted.

According to yet another aspect of the present disclosure, code implemented in a non-transitory, computer readable medium and executed by at least one hardware processor, is configured to perform receiving multiple request messages each associated with corresponding ones of the plurality of supervisory control and data acquisition (SCADA) devices from a SCADA application. For each of the received request messages, the code forwards the request message to a device driver associated with the SCADA device, and establishes an asynchronous connection for communicating with the SCADA device. The code further receives request message data associated with the request message from the device driver, and forwards the request message data to the SCADA device through the asynchronous connection. When response message data is received from the SCADA device the code forwards the response message data to the device driver in which the device driver generates a response message using the response message data. When the generated response message is received from the device driver, the code forwards the response message to the SCADA application. The request message data is transmitted independently of when the request message data associated with each of the other request messages are transmitted.

BRIEF DESCRIPTION OF THE DRAWINGS

The various features and advantages of the technology of the present disclosure will be apparent from the following description of particular embodiments of those technologies, as illustrated in the accompanying drawings. In the drawings the like reference characters may refer to the same parts throughout the different views. The drawings are not drawn to scale, rather the drawings depict only typical embodiments of the present disclosure and, therefore, are not to be considered limiting in scope.

DETAILED DESCRIPTION

Figure 1:
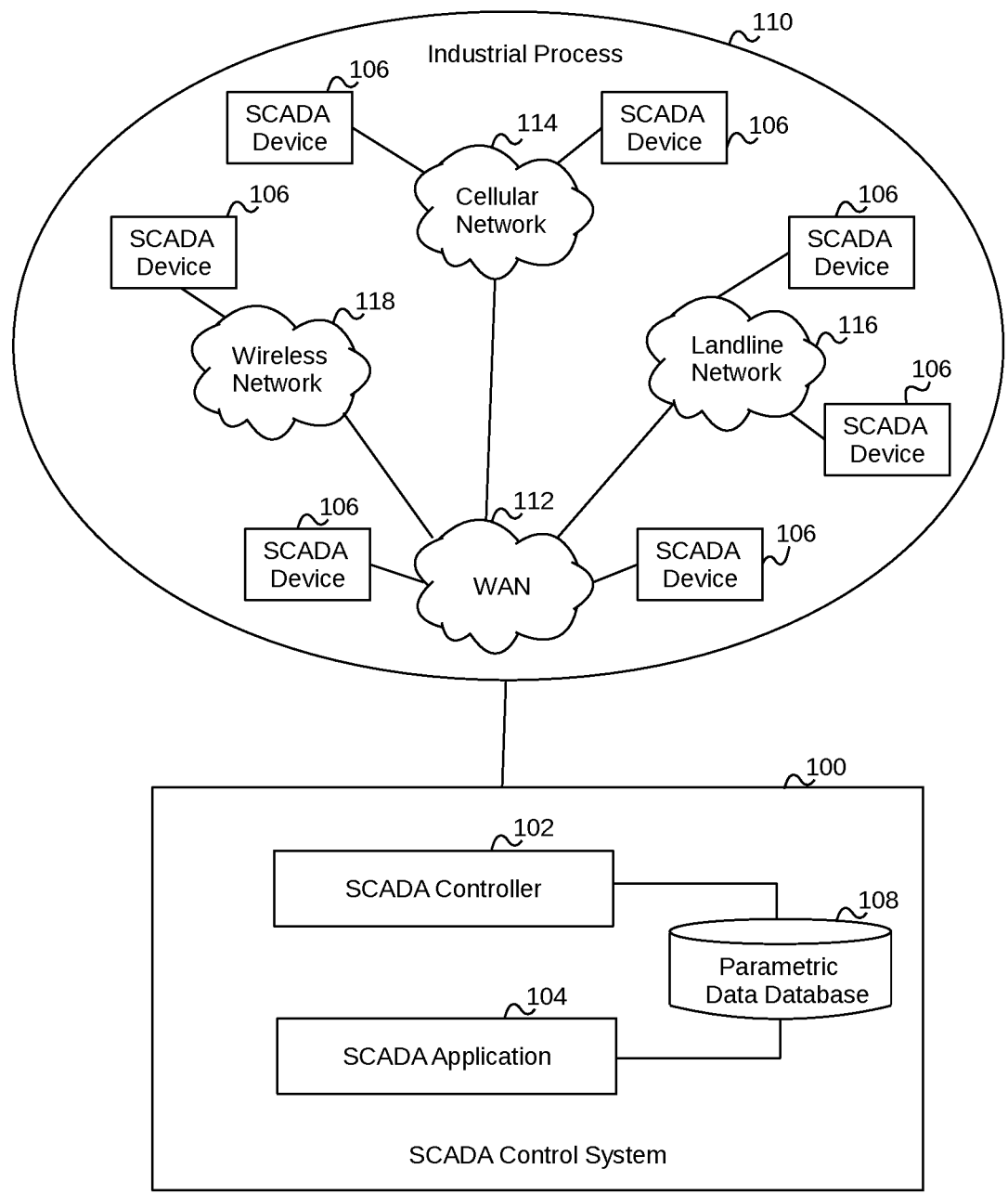
FIG. 1 illustrates an example SCADA control system according to one embodiment of the present disclosure.

In general, supervisory control and data acquisition (SCADA) systems are computer-based systems used for gathering data and/or for controlling processes in real time. SCADA systems are frequently used to monitor and control industrial equipment and processes in such industries as oil and gas production, manufacturing, energy production, transportation, and the like. A conventional SCADA system typically includes a I/O management system (e.g., SCADA controller, SCADA hub, etc.) or other host that communicates with multiple SCADA devices through a distributed communication network. Each SCADA device is typically affiliated with one or more sensors, control devices, or other field instrumentation for gathering data or affecting some aspect of the controlled system. Examples of sensors include those used for monitoring the temperature, pressure or flowrate of a gas or fluid. Examples of control devices may include switches, valves, actuators, and the like. Data observed from the various sensors is provided to the SCADA controller, which typically processes the data and responds to user inputs to create control signals that can be used to alter an industrial process via control instrumentation.

The SCADA architecture was developed as a universal means of remote access to a variety of SCADA devices, that were often provided by different vendors. Control systems using SCADA technology have become one of the most common types of industrial control systems, due to its proven reliability and ease of maintenance that have been built into its architecture over a relatively long period of time. Nevertheless, the SCADA protocol was developed long before the advent of currently available communication network technologies. Thus, many early SCADA based devices were often developed to communicate using proprietary communication protocols.

In many cases, these early SCADA systems, which have been implemented on older oil production processing facilities, are still in use today. For example, some SCADA devices (e.g., remote terminal units (RTUs)), that are deployed in certain oil production processes still communicate using devices conforming to the RS-232 communication standard, which has been largely determined to be obsolete by today's standards. Nevertheless, there exists a reluctance to replace these older SCADA-based devices with newer ones with updated communication mechanisms. A general consensus as to the reason why this reluctance has remained generally includes the costs associated with replacement of equipment that is otherwise fully functional, while having a proven track record of trouble free operation. Thus, a typical oil production process may be deployed with numerous SCADA-based devices, whose operation, and in particular its mode of communicating with other devices, varies widely among one another.

A particular type of SCADA device referred to as a remote terminal unit (RTU), which is a popular type of SCADA device used in today's SCADA environments, often includes numerous input ports for receiving parametric data as well as output ports for controlling various aspects of an industrial process. To provide this functionality, RTUs are typically equipped with a computing system executing a relatively high level operating system (e.g., Linux, UNIX, Microsoft Windows™) Additionally, because the RTUs can be, and often are, deployed in remote locations that are tens or even hundreds of miles away from their respective SCADA controllers, their computing systems are often implemented with automated diagnostic (e.g., troubleshooting) and/or maintenance (e.g., failover, repair) processes that can be remotely executed.

Because vendors of SCADA devices, such as RTUs, often provide unique, customized features to their product offerings, they may also provide device drivers that are dedicated for use with their SCADA device. Generally speaking, a device driver is a relatively small segment of executable code that controls or otherwise provides an interface to a hardware device, which in this particular case, is a SCADA device that enables a computing system (e.g., SCADA controller) to access hardware functions of the device without knowing precise details about the underlying hardware. Nevertheless, to enhance reliable setup and operation of their SCADA devices, the device drivers provided by vendors are often provided as all-encompassing turn-key solutions in which most or all device setup processes as well as other processes used to communicate with the SCADA devices are managed by the device drivers. But these all-encompassing processes are inherently blocking in that communication by the I/O management system with other SCADA devices may be held up until the synchronous communication processes have completed.

To solve this problem, conventional SCADA-based controller designs have been developed on computing systems in which each SCADA device is allocated to a separate and distinct thread, such as is found in many UNIX and Linux-based computing systems. Nevertheless, this conventional technique often adds undue overhead in the form of memory usage, particularly when used in an industrial environment, such as an oil production process. For example, a typical oil production process is often implemented with over two-hundred SCADA devices, which would require as many as two-hundred separate threads to properly communicate with each of the SCADA devices implemented in the oil production process. Additionally, because these SCADA devices may be deployed at geographically diverse locations (e.g., over hundreds of miles apart), latency issues typically encountered in publicly accessible communication networks, such as the Internet, may hinder the ability of the SCADA control process to properly monitor and control an oil production process at a level of granularity that may often be needed.

A particular problem often encountered in the oil industry is the ability to accurately report ongoing oil production amounts to differing parties or individuals, each with different interests. For example, a particular oil production process of removing and processing oil from an oilfield may involve a landowner who receives royalties based upon the amount of oil produced from his land, a transport company whose charges are based upon the amount of oil transported through its pipeline and/or trucking fleet, and the oil company that processes and sells processed oil products (e.g., gas, diesel, kerosene, motor oil, etc.) using oil obtained from the oilfield. Each of these parties may possess a keen interest in how the oil is produced, and thus accurate reporting of production amounts are important. To provide this accurate reporting, each interested party has traditionally contracted separate and distinct reporting services to monitor oil output. But this traditional technique is often fraught with inconsistencies via the use of multiple reporting agencies, whose production data may, or may not, necessarily coincide with one another.

Thus, there has heretofore remained a long felt, unmet need for a SCADA-based system having a I/O management system that can communicate with multiple SCADA devices, which are configured with disparate communication technologies, using a communication technique that does not unduly tax the underlying computing system on which it is implemented, while doing so with a relatively high degree of performance.

FIG. 1 illustrates an example SCADA control system 100 according to one embodiment of the present disclosure. The SCADA control system 100 includes a SCADA controller 102, a SCADA application 104, and a parametric data database 108 for storage of parametric data obtained from the SCADA devices 106. The SCADA control system 100 obtains parametric data from multiple SCADA devices 106 at ongoing intervals and stores the received parametric data in the parametric data database 108. As will be described in detail herein below, the SCADA controller 102 receives parametric data from the SCADA devices 106 using asynchronous (non-blocking) connections that can be used concurrently with one another by the SCADA controller 102. Thus, the computing processes used by the SCADA controller 102 may be implemented on only one or a few threads such that the SCADA controller 102 does not unduly burden the limited processing resources of the computing system on which the SCADA controller 102 is executed.

As shown, the SCADA controller 102 communicates with the SCADA devices 106 through either one or more of a wide area network (WAN) 112, a cellular network 114, a landline network 116, and/or a wireless network 118. Nevertheless, the SCADA controller 102 may communicate with each SCADA device through any suitable communication medium and/or combination of communication mediums. The WAN 112 may include any suitable type, such as an intranet, or a publicly accessible network, such as the Internet. For example, the SCADA controller 102 may communicate with the SCADA devices 106 using a Hypertext Transfer Protocol (HTTP), extensible markup language (XML), extensible hypertext markup language (XHTML), or a Wireless Application Protocol (WAP) protocol. Other examples of communication protocols exist. Additionally, communication channels through the WAN 112 may be configured within a virtual private network (VPN).

The wireless network 118 may include any combination of terrestrial wireless networks, satellite wireless networks, or other wireless communication architectures using any suitable protocol, such as wireless Highway Addressable Remote Transducer (wirelessHART) protocol, an International Society of Automation 100.11a (ISA100.11a) protocol, and the like. The SCADA controller 102 may also communicate with the SCADA devices 106 through the landline network 116, which may be, for example, a public switched telephone network (PSTN), or plain old telephone service (POTS), and/or a cellular network 114, such as a global system for mobile communications (GSM) network, or a code division multiplex access (CDMA) network.

The SCADA devices 106 may be used to receive and process SCADA process commands that may include, for example, acquiring parametric data associated with the industrial process 110 and/or controlling a control device associated with the industrial process 110. Each SCADA device 106 may be any type that receives and processes SCADA process commands from the SCADA controller 102. Examples of SCADA devices 106 may include modems that modulate and/or demodulate data to and/or from a radio frequency (RF) carrier signal, data loggers that repeatedly measure and record parametric data, electronic flow measurement (EFM) devices that measure and record fluid flow through structures (e.g., pipes), programmable logic controllers (PLCs), or even simple sensors configured with circuitry for receiving, processing, and transmitting SCADA process commands. In one embodiment, a SCADA device 106 may include a remote terminal unit (RTU) that provides localized control and/or acquisition of data at a site that is remote from the SCADA controller 102. For example, a RTU could be deployed at or near an oil, gas, or power substation that is located several miles away from the SCADA controller 102. In these or other situations, the remote terminal unit can be used to collect data from local sensors and process the data to generate control signals for local actuators without direct intervention from the SCADA controller 102. The RTU can also interact with the SCADA controller 102 as needed. In this manner, process control and automation functions can be provided at locations remote from the SCADA controller 102.

The industrial process 110 generally involves numerous SCADA devices 106 that are typically dispersed throughout a relatively large geographical region. For example, one or more SCADA devices 106 may be configured at the well site to measure various parameters of crude oil as it is removed from the ground, while one or more other SCADA devices 106 may be configured several miles away on a pipeline that is used to transport the crude oil to a processing facility, such as an oil refinery. In such a case, the SCADA controller 102 may be used to monitor the crude oil extraction and transportation process to ensure its proper operation over a relatively diverse geographical area. Although the present disclosure is directed to an industrial process 110, it is contemplated that the features of the present disclosure may be applied to other processes used to fabricate a product, modify an existing product, and/or provide some useful service. Examples of such processes may include product manufacturing, energy production and distribution, water treatment systems, transportation, and the like.

The SCADA application 104 may include any type of executable code that receives and transmits SCADA process commands for displaying parametric data associated with the industrial process 110 and/or controlling one or more aspects of the industrial process 110. For example, the SCADA application 104 may include executable code for receiving parametric data from one or more SCADA devices 106, and arranging the received parametric data on a computer display for view by a user. As another example, the SCADA application 104 may also provide a user interface, which is commonly referred to as a human machine interface (HMI). The HMI may include a graphical user interface (GUI) or a command line interface (CLI), which may be displayed on a display, such as a computer monitor, for displaying data. The SCADA application 104 may also include an input device, such as a keyboard or a pointing device (e.g., a mouse, trackball, pen, or touch screen) to enter data into or interact with the HMI. In one embodiment, the SCADA application 104 may include a web service that stores parametric data obtained from the SCADA devices 106, and provides the stored parametric data to subscriber devices using a subscriber-based model. Additional details of the SCADA application 104 implemented as a web service will be described in detail herein below.

The SCADA controller 102, SCADA application 104, and parametric data database 108 are stored in a memory and executed on a processing system of a computing system. The processing system may include one or more processors. The computing system may include any suitable components, such as one or more management computing systems, personal computers, mobile computers and/or other mobile devices, and/or other hosts. For example, the SCADA controller 102 and SCADA application 104 may include instructions that may be executed in an operating system environment, such as a Microsoft Windows™ operating system, a Linux operating system, or a UNIX operating system environment. Although the SCADA controller 102 and SCADA application 104 is shown and described as a computer-based design incorporating instructions stored in a memory and executed by a processing system, it should be understood that the SCADA controller 102 and SCADA application 104 may be a distributed computing system embodied on multiple computing systems that communicate among one another using standard communication architectures (e.g., Ethernet, etc.).

The memory of the computing system comprises a non-transitory computer readable medium including volatile media, nonvolatile media, removable media, non-removable media, and/or other available medium. By way of example and not limitation, the memory may include computer storage media, such as non-transient storage memory, volatile media, nonvolatile media, removable media, and/or non-removable media implemented in a method or technology for storage of information, such as computer readable instructions, data structures, program modules, or other data. The memory also stores data used for operation of the SCADA controller 102. For example, the memory may store one or more device drivers 204, and a request queue 210, an active polling job list 212, and a response queue 214 the purpose and function of which will be described in detail herein below.

Figure 2:
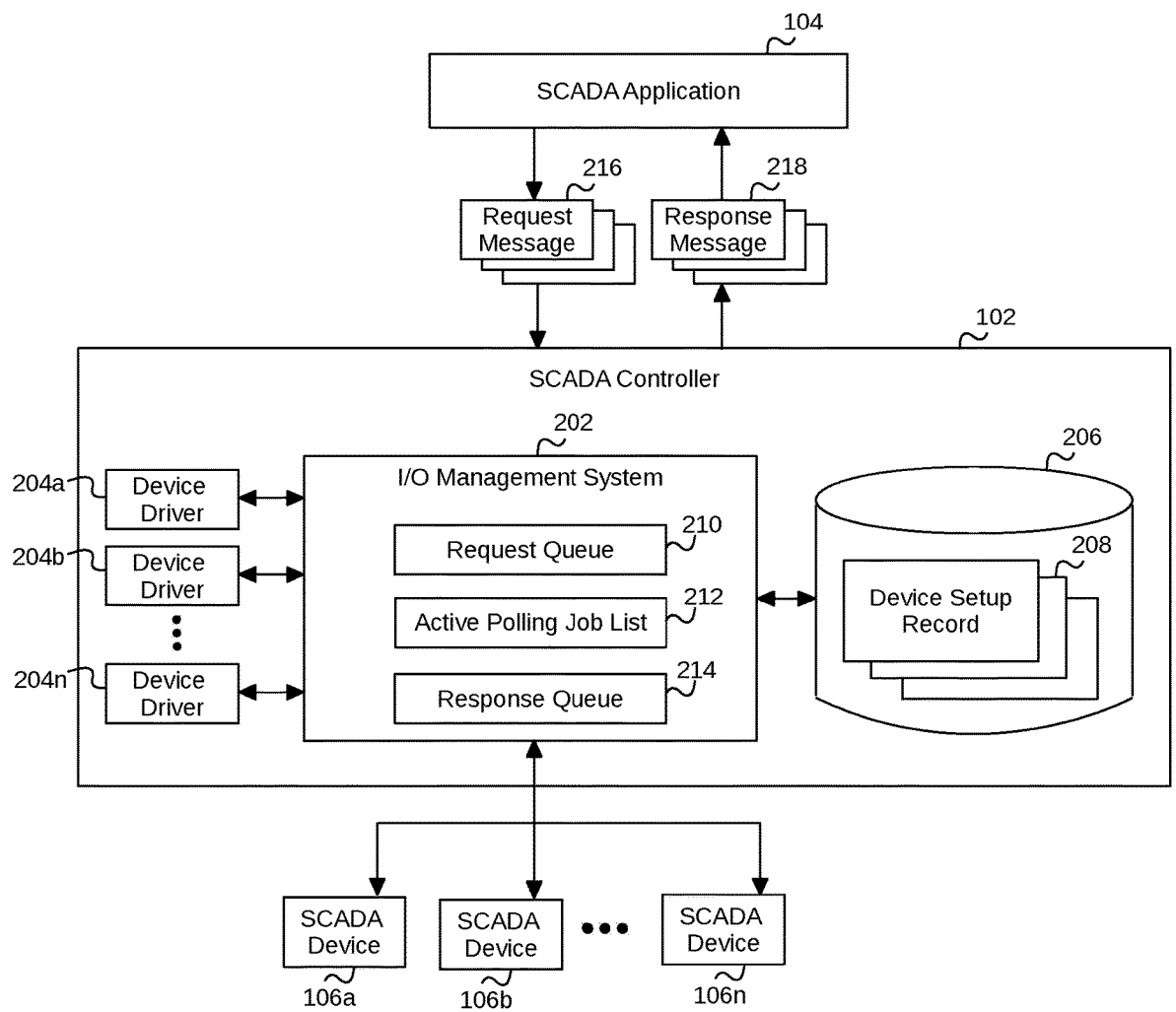
FIG. 2 illustrates several example components of the I/O management system according to one embodiment of the present disclosure.

FIG. 2 illustrates several example components of the SCADA controller 102 according to one embodiment of the present disclosure. As shown, the SCADA controller 102 includes an input/output (I/O) management system 202, multiple custom device drivers 204, and a device setup database 206 for storage of one or more device setup records 208. The I/O management system 202 includes a request queue 210, an active polling job list 212, and a response queue 214. The request queue 210 temporarily stores ongoing request messages 216 received from the SCADA application 104 until they are processed by the I/O management system 202, while the response queue 214 temporarily stores ongoing response messages 218 until they are retrieved by the SCADA application 104. The active polling job list 212 stores information about active polling jobs managed by the I/O management system 202.

Within this disclosure, a polling job is defined as a set of actions taken by the I/O management system 202 to receive a request message 216 from the SCADA application 104, transmit the request message 216 to a particular SCADA device 106, receive a response message in accordance with the transmitted message from the SCADA device 106, and transmit the received response message to the SCADA application 104. Moreover, an active polling job is defined as one in which its associated request message 216 has been transmitted to its respective SCADA device 106 while no response message has yet been received. Additional details about the request queue 210, active polling job list 212, and response queue 214 will be described in detail herein below.

Shown herein below is a particular example request message 216 that may be received by the I/O management system 202 from the SCADA application 104.

| | |
|---|---|
| DeviceID | 8211 |
| Request Tags | {"TEMP1", "PRESS7", "BATTERY_VOLTS"} |

As shown, the request message 216 includes a DeviceID field and a Request Tags field. The DeviceID field indicates a unique identifier (ID) of the SCADA device 106 that is to be addressed by the request message 216. The Request Tags field includes a comma delimited list of textual information that may be used by the SCADA device 106 to determine what parameters are to be returned to the I/O management system 202 in the response message 218.

Shown herein below is another example response message 218 that may be received from the SCADA device 106.

| | |
|---|---|
| DeviceID | 8211 |
| Response Tags | {"TEMP1"=86.2, "PRESS7"=12031, "BATTERY_VOLTS"=12.82} |

As shown, the response message 218 includes a DeviceID field and a Response Tags field. The DeviceID field indicates a unique identifier (ID) of the SCADA device 106 that generated the response message 218. The Response Tags field includes a comma delimited list of parametric data, which in this particular case, has been generated by the SCADA device 106 in response to the textual information included in the Request Tags field of the request message 216. While the example request message 216 and corresponding response message 218 shown above depicts how parametric data may be received from the SCADA device 106, the request messages 216 and response messages 218 may also be used to manipulate or control a device associated with the SCADA device 106. For example, shown below is another particular example request message 216 that may be received from the SCADA application 104.

| | |
|---|---|
| DeviceID | 8211 |
| Write Tags | {"VALVE1_POSITION"=OPENED, "SHUTIN SETPOINT"=200} |

As shown, the request message 216 includes a DeviceID field and a Write Tags field. The DeviceID field indicates a unique identifier (ID) of the SCADA device 106 that is to be addressed by the request message 216, while the Write Tags field includes a comma delimited list of textual information that may be used by the SCADA device 106 to control a device, which in this particular example, is a valve.

Shown herein below is a particular example response message 218 that may be generated by the SCADA device 106 in response to receipt of the request message 216 shown above.

| | |
|---|---|
| DeviceID | 8211 |
| Response | SUCCESS |

As shown, the response message 218 includes a DeviceID field and a Response field. The DeviceID field indicates a unique identifier (ID) of the SCADA device 106 that generated the response message 218, while the Response field includes parametric data indicating whether the control instruction included in the request message 216 was successful or not.

Although several example request messages 216 and response messages 218 are shown, other embodiments may include different fields, additional fields, or fewer fields without departing from the spirit and scope of the present disclosure. Additionally, the parameters or their associated parametric values may be represented by data forms other than textual information, such as by an arrayed list or by coded values.

According to embodiments of the present disclosure, the custom device drivers 204 are each adapted to facilitate communication with SCADA devices 106 with a particular SCADA protocol type. Examples of SCADA protocol types may include those developed by a standards entity (e.g., a modbus RTU protocol, a modbus ASCII protocol, a modbus TCP protocol, an Ethernet Industrial Process protocol, etc.), and those vendor dependent protocols (e.g., an Enron Modbus protocol, a Scadapack Modbus protocol, a Bristol BSAP protocol, a Totalflow Native protocol, an Emerson ROC protocol, a Kimray DACC protocol, Amoco Hex Repeater protocol, Ferguson Beauregard FBNet protocol, Totalflow Remote protocol, Modbus Enron protocol, Modbus SCADApack protocol, Modbus Lufkin protocol, etc.). According to other embodiments of the present disclosure, the custom device drivers 204 may be adapted to facilitate communication with SCADA devices 106 that operate at the packet level (e.g., a serial RS232 protocol, a serial RS485 protocol, a Serial Radio protocol, a Ethernet TCP/IP protocol, a Cellular TCP/IP protocol, etc.). In a particular example, the custom device driver 204a may include modbus RTU protocol logic for communicating with the SCADA device 106a that uses the modbus RTU protocol, while the custom device driver 204b may include Totalflow Native modbus RTU protocol logic for communicating with the SCADA device 106b that uses the Totalflow Native protocol, and so on.

Embodiments of the present disclosure may provide one or more advantages over conventional SCADA controllers heretofore known in the art. For example, conventional device drivers, which are often developed by the vendor of the SCADA device, typically manage most or all communication (e.g., protocol conversion processes, connection control processes, etc.) with its respective SCADA devices. This is often done for several reasons, which may include, for example, the ability to provide a ready made (e.g., turn key) deployment solution for the user of the SCADA device 106. Nevertheless, the all-encompassing communication control processes natively provided in the conventional device drivers are also typically synchronous (e.g., blocking) for various reasons including the ability to enhance the reliability of communications between its associated SCADA device 106 and SCADA application 104. This feature, however, becomes particularly burdensome when the SCADA application 104 desires to communicate with relatively large numbers (e.g., greater than 1,000 connection sessions) of SCADA devices concurrently. Embodiments of the present disclosure may provide a solution to this problem, among other problems, by providing custom device drivers 204 for each type of protocol used by the SCADA devices 106 in which connection control processes are essentially abstracted (e.g., removed) from the device driver and administered by the I/O management system 202 so that the resulting connections formed with the SCADA devices 106 are generally asynchronous (e.g., non-blocking) in nature. Additionally, because certain embodiments of the custom device drivers 204 may be generally void of any connection control process, development of new custom device drivers 204 is a relatively simple task because only development of the protocol conversion process for the new SCADA protocol is necessary in most cases.

The device setup database 206 stores device setup records 208 that are each associated with a particular SCADA device 106 or a group of SCADA devices 106. Each device setup record 208 includes contextual (device specific) information needed to communicate with a SCADA device 106, such as a SCADA device address (IP address, URL, etc.) of the SCADA device 106, a model number of the SCADA device 106, and/or a security code associated with its particular SCADA device 106. Each device setup record 208 may also store information associated with unique settings (e.g., attributes) to be used by the device drivers 204. Examples of such settings may include keepalive message attributes, watchdog timer attributes, error handling process attributes, handshaking attributes, network time protocol (NTP) configuration attributes, error checking attributes, and the like.

Shown herein below is a particular example device setup record 208 that may be stored in the device setup database 206.

| | |
|---|---|
| DeviceID | 8211 |
| Description | Cottonwood #3 RTU |
| Driver | Totalflow Native |
| Driver Options | {StationID = "COTTWD3", Password="4381", PacketSize="2kb", ...} |
| IP Address | 192.168.0.82 |
| TCP Port | 9999 |
| Packet Retries | 3 |
| Delay between packets | 100 ms |
| Max attempts | 2 |
| Delay between attempts | 5s |
| Max session length | 15 |

As shown, the device setup record 208 includes a DeviceID field, a Description field, a Driver field, a Driver Options field, an IP Address field, a TCP Port field, a Packet Retries field, a Delay Between Packets field, a Max Attempts field, Delay Between Attempts field, and a Max Session Length field that provide contextual information for communicating with each particular SCADA device 106. Nevertheless, it should be appreciated that other embodiments may include different fields, additional fields, or fewer fields without departing from the spirit and scope of the present disclosure.

The DeviceID field indicates a unique identifier (ID) of the SCADA device 106, and a Description field including free-form text to aid in user identification of the SCADA device 106. The Driver field includes information for obtaining a custom device driver 204 for communicating with the SCADA device 106, while the Driver Options field includes additional information that may be used by the I/O management system 202 to setup and maintain a connection with the SCADA device 106. The IP Address and TCP Port fields indicate a particular network address, and port, respectively, that can be used to uniquely access the SCADA device 106 over a communication network, such as the Internet.

The Packet Retries field, Delay Between Packets field, Max Attempts field, Delay between Attempts field, and Max Session Length field may be used to manage failure conditions that may occur with the connection. For example, the Packet Retries field specifies a quantity of times that a failed packet transmission may be attempted over the connection, while the Delay Between Packets field specifies an elapsed duration of time that the I/O management system 202 may wait before sending an ensuing packet when a previous packet has not been acknowledged. Additionally, the Max Attempts field specifies a quantity of times that a request message may be attempted, the Max attempts field specifies a quantity of re-tries that may be attempted for the request message, the Delay Between Attempts field specifies an elapsed time between re-tries that may be used to manage re-transmission attempts of the request messages to the SCADA device 106. Additionally, the Max Session Length field specifies an overall duration of each communication session with the SCADA device 106.

Thus, the fields of the device setup record 208 may provide contextual information for tailoring the communication parameters that function with each individual SCADA device 106. In a particular example, a first device setup record 208 configured for use with a first SCADA device 106 that is deployed in a location that is known to have a relatively large number of network outages may be configured with different connection control parameters relative to a second similar SCADA device 106 that is deployed in a location where relatively reliable network communication exists. Also, the device setup record 208 may provide an advantage in that it abstracts information particular to each SCADA device 106 so that a single custom device driver 204 may be implemented for each SCADA protocol type in certain embodiments.

Although FIG. 2 illustrates one example SCADA controller 102 that may be used for controlling the operation of multiple, disparate SCADA devices 106, it should be appreciated that the SCADA controller 102 may be embodied in other specific forms without deviating from the spirit and scope of the present disclosure. For example, the SCADA controller 102 may have additional, fewer, or different features than those described above. In this regard, the SCADA controller 102 may include additional processes for controlling how device drivers 204 and/or device setup records 208 are added or changed as new SCADA devices 106 are added to the system or existing SCADA devices 106 are modified, respectively. Additionally, the SCADA controller 102 may be executed on a single computing system, or on a distributed computing system in which certain processes are distributed over multiple networked computing systems.

Figure 3A:
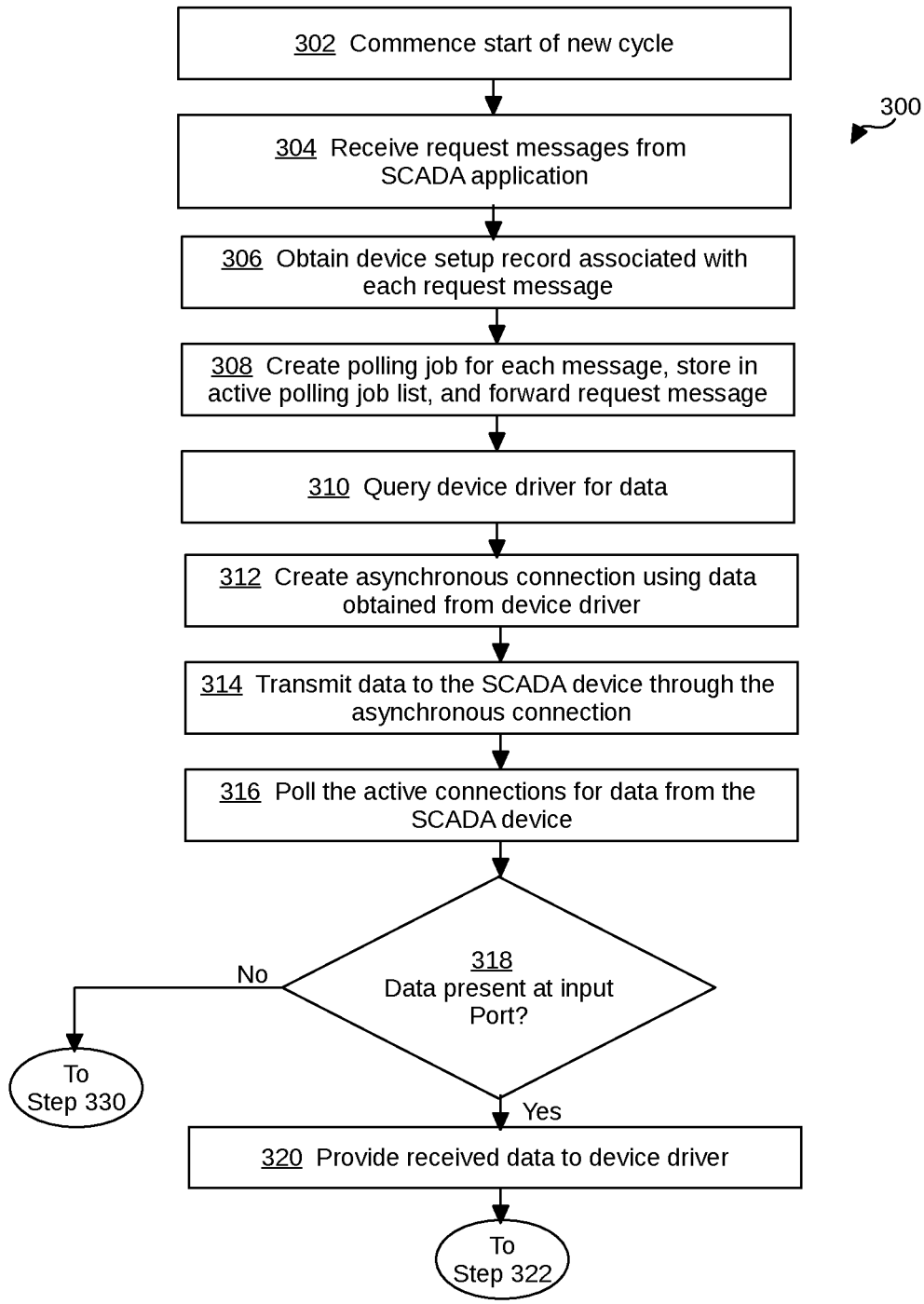
FIGS. 3A and 3B illustrate an example process that may be performed by the I/O management system according to one embodiment of the present disclosure.
Figure 3B:
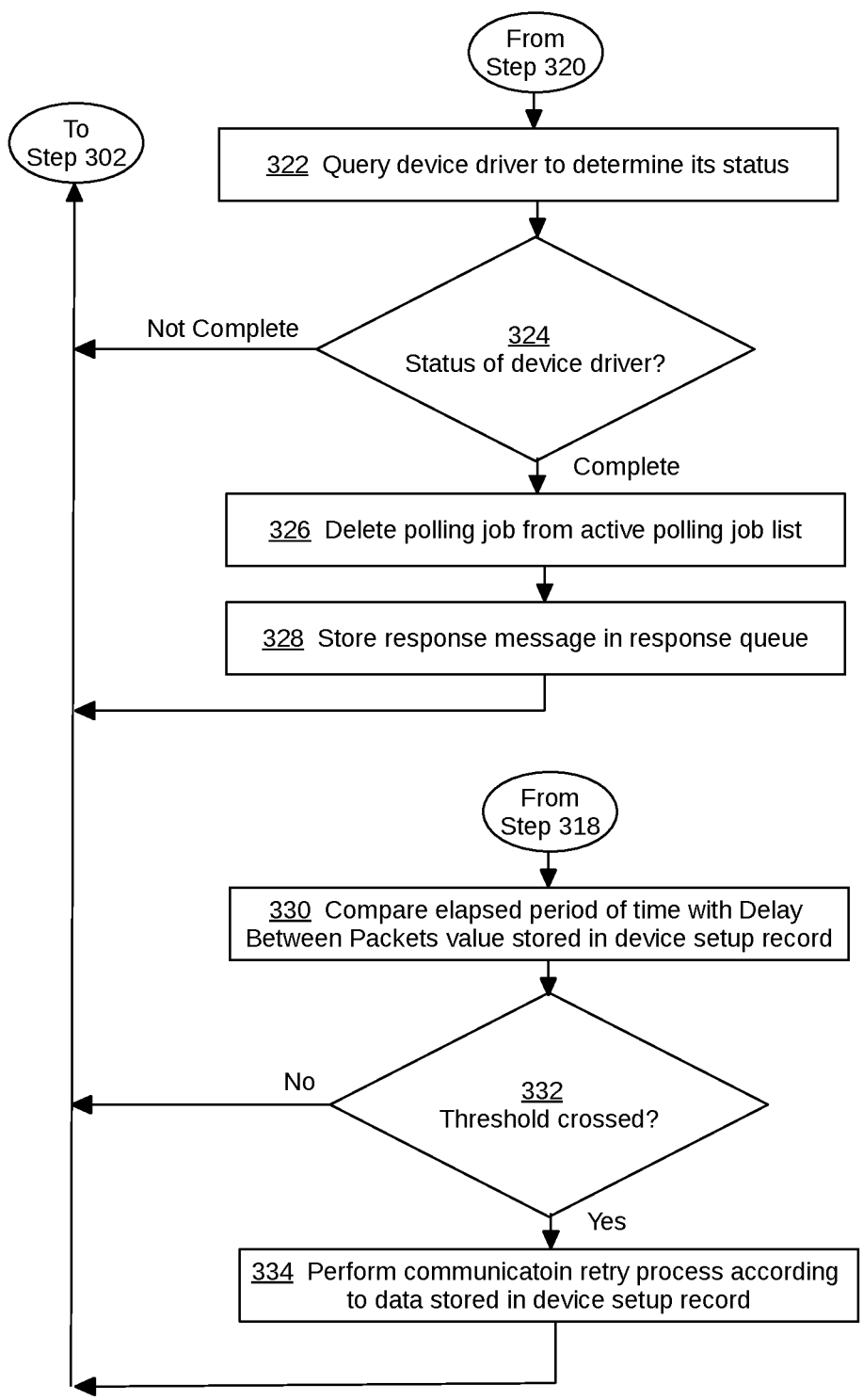

FIGS. 3A and 3B illustrate an example process 300 that may be performed by the I/O management system 202 according to one embodiment of the present disclosure. Generally speaking, the process 300 described herein below is a cyclical process that is repeatedly performed throughout the operation of the I/O management system 202.

At step 302, the I/O management system 202 commences the start of a new cycle. In one embodiment, the process 300 including the steps of 302 to 334 define an ongoing cycle that is repeatedly performed throughout the operation of the I/O management system 202. For example, the cycle may be an initial cycle that is performed for the first time such that the active polling job list 212 is empty. As another example, the cycle may be one that is performed after one or more previous cycles have been performed. In such a case, therefore, one or more polling jobs that have been created in previous cycles may currently exist in the active polling job list 212.

At step 304, the I/O management system 202 receives one or more request messages 216 from the SCADA application 104. Such a case may exist, for example, when a user of the SCADA application 104 desires to view all or a portion of a sub-system of the industrial process 110 such that one or a group of request messages 216 are received from the SCADA application 104. The I/O management system 202 then obtains a device setup record 208 associated with each request message 216 at step 306. For example, the I/O management system 202 may identify unique identifying information, such as information included in the Device ID field of the request message, indicating which particular SCADA device 106 is addressed by the request message, and obtain the device setup record 208 having that Device ID value. Thereafter at step 308, the I/O management system 202 creates a polling job for each request message, stores information associated with each polling job in the active polling job list 212, and forwards the request message to a device driver 204 associated with the SCADA device 106. Thus, the active polling job list 212 may include polling jobs associated with the request messages 216 received at step 304 as well as polling jobs created in previous cycles. For example, the active polling job list 212 may be appended to include the request message along with information associated with the device setup record 208.

At this point, the device driver 204 processes the request message 216 by generating interim sets of data that can be transmitted to the SCADA device 106 for obtaining a response message. In general, the device driver 204 includes logic for implementing a particular protocol used by the SCADA device 106. For example, the device driver 204 may generate one or more interim sets of data to perform a certain handshaking process according to a particular protocol for communicating with the SCADA device 106.

Steps 310 to 334 herein below describe actions that may be performed for each polling job stored in the active polling job list 212. If no polling jobs exist in the active polling job list 212, then processing continues at step 302 to commence a new cycle. The polling jobs may include those that have been created at step 308 of the current cycle in addition to those polling jobs that have been created in a previous cycle.

At step 310, the I/O management system 202 queries an applicable device driver 204 for data to transmit to the SCADA device 106. The I/O management system 202 may identify the applicable device driver 204 by, for example, examining the driver field of the device setup record 208, and selecting the device driver 204 associated with that driver field value. In one embodiment, the I/O management system 202 may provide information associated with the device setup record 208 to the device driver 204 so that the device driver 204 may determine which, if any particular data is to be transmitted to the SCADA device 106. For example, the device driver 204 may include executable logic for obtaining password (passcode) information from the device setup record 208 to generate a request message that may be transmitted to the SCADA device 106 for establishing a login session. As another example, the device driver 204 may include executable logic for obtaining network address and port information from the device setup record 208 for uniquely accessing the applicable SCADA device 106 through the communication network.

At step 312, the I/O management system 202 creates an asynchronous connection using data received from the device driver 204. In general, the connection is established to be asynchronous in that it does not block other connections established by the I/O management system 202. In a particular implementation, the connection may be established using a socket connection (e.g., datagram socket or stream socket) that provides a relatively reliable connection without creating any blocking condition with other connections. It may be important to note that the asynchronous connection is established by the I/O management system 202, and not the device driver 204. Given this arrangement, the I/O management system 202 controls the operation of the connection so that it can be maintained in a non-blocking configuration. This arrangement is substantially different than conventional device drivers that control the operation of the connection such that they often create synchronous (blocking) conditions for any process that uses those conventional device drivers.

At step 314, the I/O management system 202 transmits data associated with the request message to the SCADA device 106 through the asynchronous connection. In some cases, the data may include the entire request message, while in other cases, the data may form a portion of a sequence of multiple interim messages that are transmitted to and from the SCADA device 106 in order to consummate the transmission of the request message to the SCADA device 106, and receive a corresponding response message from the SCADA device 106. For example, a particular request message 216 received from the SCADA application 104 may involve multiple interim sets of data that are sent to the SCADA device 106. In this regard, certain interim messages sent to a particular SCADA device 106 may involve a series of handshaking messages that may be used to ensure proper communication, and/or the configuration (setup) of one or more operational aspects of the SCADA device 106.

In one embodiment, the I/O management system 202 may use executable code present in the device driver 204 to convert the request message from a standardized protocol used by the SCADA application to a native protocol of the SCADA device 106. For example, the device driver 204 may convert the arrangement of data included in the request message. As another example, the I/O management system 202 may convert the data according to a particular measurement unit (e.g., metric, United States Customary Units (USCS), etc.), or how the data is presented (e.g., 563.4, 5.63E+2, etc.).

In another embodiment, the standardized protocol used by the SCADA application 104 comprises a proprietary format that is limited to use by the SCADA application 104. Thus, the resulting parametric data may be secured from illicit access as well as secured from tampering with the parametric data as it is transported over a publicly accessible communication medium, such as the Internet.

At step 316, the I/O management system 202 polls the active connections for data from the SCADA device 106. In a particular example in which the connections have been established using an internet socket (e.g., stream socket or datagram socket), the handle (e.g., socket descriptor) of each socket may be examined to determine whether a response message exists at the input port of the internet socket. Therefore at step 318, if data has been determined to be waiting at an input port of an active connection, the process continues at step 320; otherwise, the I/O management system 202 continues processing at step 330. Thereafter at step 320, the I/O management system 202 provides the data to the device driver 204 for processing. For example, if the data received from the SCADA device 106 comprises a completed response message in which all interim messages between the device driver 204 and the SCADA device 106 have been completed, the device driver 204 may convert the response message from the native protocol of the SCADA device to the standardized protocol used by the SCADA application 104. Nevertheless, it should be appreciated that in some embodiments, the device driver 204 may provide no response message conversion if not needed or desired.

At step 322, the I/O management system 202 queries the device driver 204 to determine its status. At step 324, if the device driver 204 returns with a complete status, processing continues at step 326. If, however, the device driver 204 returns with a continue status, processing continues at step 302. In general, the continue status refers to a state in which the device driver 204 is currently, but has not yet finished processing previously received data from the SCADA device 106. In some cases, the overall cycle as described herein extending from step 302 to step 334 can be completed at a rate of up to 50 times per second. At such a rate, conditions may exist where the device driver 204 is still processing previously received data when the I/O management system 202 performs step 322. Thus, the continue state may be used to allow the device driver 204 complete processing of its previously received data while the I/O management system 202 continues execution of the current cycle. Such a behavior provides a non-blocking condition in which the actions of the device driver 204 does not impede the execution of each cycle by the I/O management system 202.

At step 326, the I/O management system 202 deletes the polling job from the active polling job list 212, and at step 328, the I/O management system 202 stores the response message 218 obtained from the device driver 204 in the response queue 214. At this point, the response message 218 is available to be accessed and used by the SCADA application 104, and the I/O management system 202 continues processing at step 302. When accessed by the SCADA application 104, the I/O management system 202 may delete the response message 218 from the response queue 214 such that the response queue 214 only includes response messages 218 that are pending access by the SCADA application 104.

Step 330 is performed in the event that no data has been received from the SCADA device 106 during the current cycle. At step 330, the I/O management system 202 determines whether no data has been received beyond a specified period of time. In particular, the I/O management system 202 may query the device setup record 208 associated with the request message 216 and compare the queried value with an elapsed period of time since the request message was issued to the SCADA device 106. If no data has been received, the I/O management system 202 continues operation at step 332; otherwise it continues operation at step 302 to continue polling for new messages at step 332.

At step 334, the I/O management system 202 performs a communication retry process according to one or more parameters stored in the device setup record 208. For example, the I/O management system 202 may increment a packet retry counter to indicate that one packet was not received within the allocated delay time specified in the delay between packets field of the device setup record 208. Additionally, the I/O management system 202 may check whether the quantity of packet retries has exceed the quantity of retries value stored in the packet retry field of the device setup record 208. In a likewise manner, other conditions associated with the SCADA device, such as the max attempts field, delay between attempts field, and max session length field may be used by the I/O management system 202 to determine whether communication with the SCADA device 106 has failed. If either of these threshold values are met, the I/O management system 202 may delete the polling job from the active polling job list 212, and store an error message in the response queue 214 to indicate that a successful response message was not obtained from the SCADA device 106. Thus, at this point, continued polling of the SCADA device 106 has ceased, and the I/O management system 202 continues at step 302 to continue processing other request messages stored in the active polling job list 212.

The polling process 300 may be continually performed throughout the duration of the SCADA controller's operation. Nevertheless, when use of the polling process 300 is no longer needed or desired, the process ends.

Thus as described above, the I/O management system 202 manages the connection with each SCADA device 106, while each device driver 204 manages a communication protocol used to communicate with each SCADA device 106. That is, the device driver 204 does not communicate directly with its respective SCADA device 106; rather, it communicates with the SCADA device 106 through the I/O management system 202. As such, the I/O management system 202 can establish asynchronous connections with each of the SCADA devices 106 in which the request message data for each request message is transmitted independently of when the request message data associated with each of the other request messages are transmitted. This functionality differs substantially from conventional SCADA device drivers that communicate directly with their respective SCADA devices 106, thus often consuming at least one process thread while a response message is pending in response to a corresponding request message.

Although one example process for transmitting SCADA-based request messages and receiving response messages according to those request messages has been described, it should be appreciated that the process may be embodied in other specific forms without deviating from the spirit and scope of the present disclosure. For example, the process may utilize additional, different, or fewer steps than what is described herein. Additionally, the steps of the process may be performed in a sequence that is different than the process described herein. As another example, the communication retry process described in steps 334 may use additional, different, or fewer parameters to determine the health of the communication connection.

Figure 4:
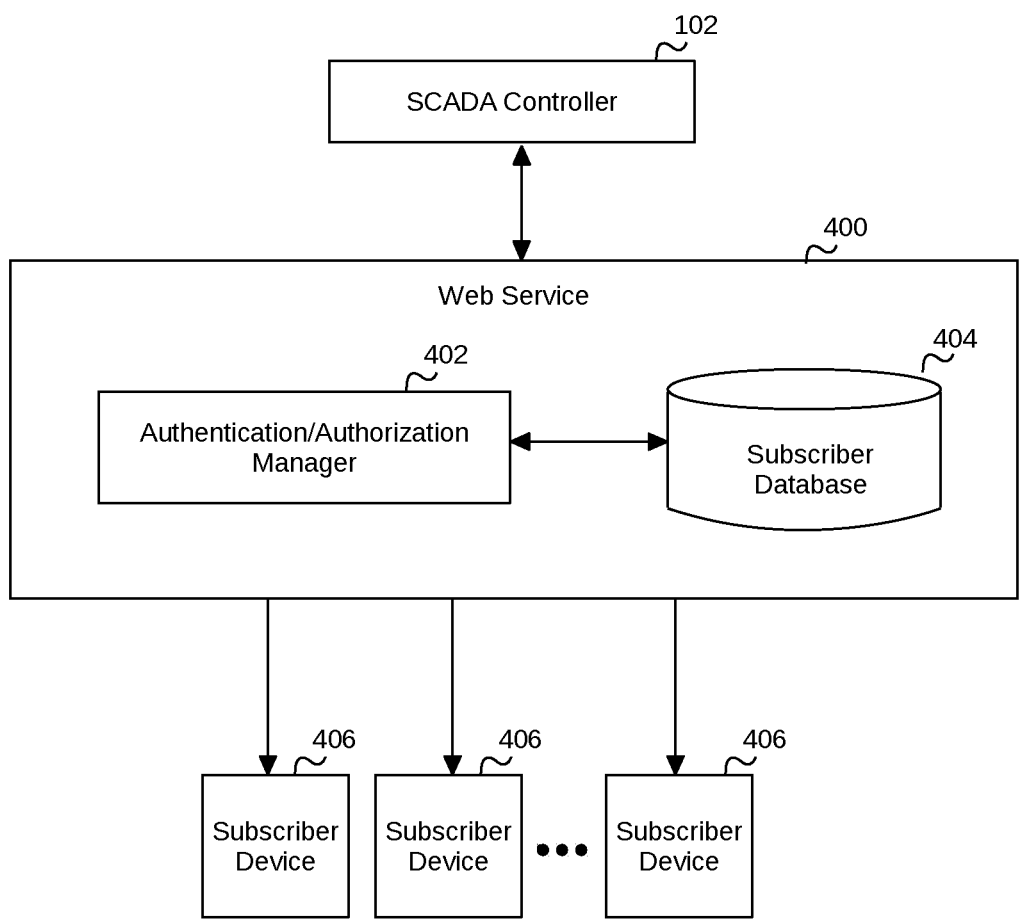
FIG. 4 illustrates several example components of a web service according to one embodiment of the present disclosure.

FIG. 4 illustrates several example components of a web service 400 according to one embodiment of the present disclosure. The web service 400 as shown, can be embodied as the SCADA application 104 as shown and described above. The web service 400 includes an authentication/authorization manager 402 and a subscriber database 404. The web service 400 processes requests from each of multiple subscriber devices 406 to receive certain portions of the stored parametric data according to one or more access rights allocated to that subscriber device 406. The SCADA controller 102 receives the parametric data independently of when the web service 400 processes requests for such data so that the parametric data database 108 may be continually updated with new parametric data to provide accurate, up-to-date information for consumption by each user of his or her respective subscriber device 406.

Embodiments of the present disclosure may provide certain advantages not heretofore recognized by conventional SCADA-based systems. For example, the SCADA controller 102 and web service 400 function independently of one another so that a single parametric data database 108 may be used for storage of parametric data that is accessible by multiple users (e.g., subscribers) on an on-demand basis. That is, the web service 400 selectively provides parametric data to subscribers using an access rights model so that most or all parametric data may be stored in a single location, while access to that data is effectively regulated according to each subscriber's subscription account. Moreover, the SCADA controller 102 continually updates the parametric data database 108 at ongoing intervals (e.g., every 30 minutes) so that a relatively current version of the data is maintained. Therefore, because multiple, independent databases are not required, a SCADA system may be realized that is easy to maintain, while maintaining a relatively high degree of performance by alleviating the need to retrieve the same parametric data multiple times for each interested party that wishes to view such data.

The web service 400 functions as a portal for subscriber devices 406 to access selective portions of the parametric data stored in the parametric data database 108. One example of a suitable web service 400 may include an Apache Tomcat™ server, which is developed and maintained by the Apache Software Foundation, located in Forest Hill, Md. Other types of web services may be used, such as MySQL™, SQLite™, MongoDB™ web services. The web service can include any appropriate hardware, software and firmware for integrating the subscriber devices 406 with the web service 400 as needed to provide access to the parametric data in the parametric data database 108. In some cases, the web service 400 may generate content including, but not limited to, text, graphics, audio, video and/or other content to be provided to the user, which may be served to the user by the web service 400 in the form of HyperText Markup Language ("HTML"), Extensible Markup Language ("XML"), JavaScript, Cascading Style Sheets ("CSS") or any other appropriate client-side structured language. Content transferred to a subscriber device 406 may be processed by the subscriber device 406 (e.g., client device) to provide the content in one or more forms including, but not limited to, forms that are perceptible to the user visually and/or audibly. The handling of all requests and responses, as well as the delivery of content between each subscriber device 406 and the web service 400, may be handled using Hypertext Preprocessor ("PHP"), Python, Ruby, Perl, Java, HTML, XML or another appropriate server-side structured language. The web service 400 may be configured to communicate with any suitable subscriber device 406, such as a personal computer executing a web browser for generating a webpage, a tablet computing device, and/or a smart phone executing a mobile application (e.g., a mobile app).

The authentication/authorization manager 402 manages login sessions with each subscriber device 406, and allocates certain portions of the parametric data to be transmitted to each subscriber device 406 according to a subscription negotiated between a user of the subscriber device 406 and an administrator of the SCADA control system 100. For example, the authentication/authorization manager 402 may provide for authentication of a subscriber device 406 using any suitable means, such as using a username/password combination, passcode, fingerprint scan, and the like, to ensure the identity of a user of the subscriber device 406. Once authenticated, the authentication/authorization manager 402 may access the subscriber database 404 to identify a subscription (e.g., account) of the subscriber device 406, and any particular access rights (AR) associated with that subscription. Using the access rights associated with that subscriber device 406, the authentication/authorization manager 402 may then access certain portions of the parametric data stored in the parametric data database 108 according to the access rights of the subscriber device 406.

Within this disclosure, the term 'subscription' means providing a product or service (e.g., providing parametric data) to a customer for a specified period of time, and may in some cases, involve payment for use of those products or services from the customer to the provider of those products or services. In some embodiments, to consummate the subscription, the authentication/authorization manager 402 may facilitate a financial transaction between a financial account (e.g., bank) associated with the customer by communicating with a financial account server of the financial account to provide payment for the subscription. Once payment is received, the authentication/authorization manager 402 may communicate with a financial account server associated with the administrator to transfer the received payment to the administrator who manages the operation of the SCADA control system 100. The financial account server of the administrator generally refers to any suitable entity that stores information associated with a financial account maintained for the administrator that maintains the system 100, while the financial account server of the customer generally refers to another entity associated with a financial account of the customer. The financial account server of the administrator, and the financial account server of the customer each have one or more processors and executable instructions stored in volatile and/or non-volatile memory for performing the actions and/or steps described herein.

Figure 5:
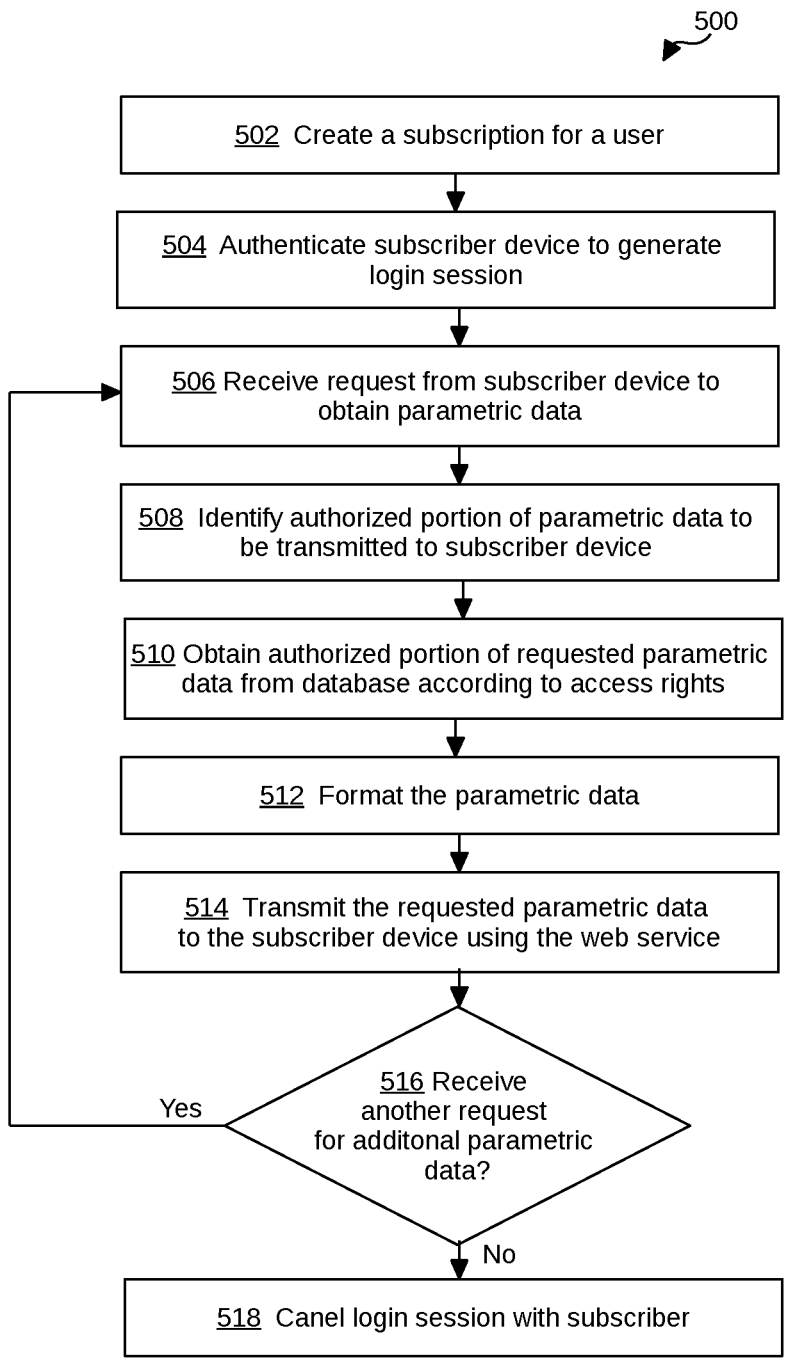
FIG. 5 illustrates a process that may be performed by the web service to transmit the stored parametric data to a subscriber device upon user demand according to one embodiment of the present disclosure.

FIG. 5 illustrates a process 500 that may be performed by the web service 400 to transmit the stored parametric data to a subscriber device 406 upon user demand according to one embodiment of the present disclosure. In particular, the steps of process 500 may be performed independently of the steps of process 300 so that the parametric data may be maintained in a single location and delegated to each subscriber device 406 on a subscription basis.

At step 502, the web service 400 creates a subscription with a user, such as a user of a subscriber device 406. The subscription may include information associated with certain access rights to certain portions of the parametric data stored in the parametric data database 108, such as head pressure of a pipeline, flowrate of the pipeline, end pressure of the pipeline, and the like that may be associated with a particular oilfield production process.

At step 504, the web service 400 authenticates the subscriber device 406 to generate a login session with the subscriber device 406. For example, the web service 400 may receive a message from the subscriber device 406 that includes a user name and password, and authenticate the user by accessing the subscriber database 604 to ensure that the user is a valid subscriber. Thereafter at step 506, the web service 400 receives a request to obtain parametric data from the parametric data database 108. The request may request that the entire portion of parametric data, which the subscriber device 406 has a subscription to, be transmitted to the subscriber device 406. Alternatively, the request may request that only some portion of the parametric data, which the subscriber device 406 has a subscription to, be transmitted to the subscriber device 406.

At step 508, the web service 400 identifies the portion of the parametric data that is authorized to be sent to the subscriber device 406. Thereafter at step 510, the web service 400 obtains the identified parametric data from the parametric data database 108.

At step 512, the web service 400 formats the parametric data according to one or more criteria. For example, the web service 400 may receive a request to receive flowrate parametric data that is within a particular date range (e.g., Mar. 1, 2018 to Apr. 30, 2018). Thus in such a case, the web service 400 will receive all flowrate parametric data that has been stored in the parametric data database 108 that is within that date range. As another example, the web service 400 may format the data according to a particular measurement unit (e.g., metric, United States Customary Units (USCS), etc.). Thus in such a case, if the parametric data is stored in a metric format, the web service 400 may perform one or more calculations to format the parametric data is USCS form. Thereafter at step 514, the web service 400 transmits the obtained and formatted parametric data to the subscriber device 406 through the web service 400.

The web service 400 may receive requests for additional parametric data during the login session established with the subscriber device 406. If so, at step 516, the web service 400 continues processing at step 506 to receive and process additional requests from the subscriber device 406; otherwise, processing continues at step 518 in which the login session with the subscriber device 406 is canceled.

Although FIG. 5 describes one example of a process that may be performed by the web service 400 for managing requests for parametric data from a subscriber device 406, the features of the disclosed process may be embodied in other specific forms without deviating from the spirit and scope of the present disclosure. For example, the web service 400 may perform additional, fewer, or different operations than those operations as described in the present example. As another example, the steps of the process described herein may be performed by a computing system other than the one used to execute the SCADA controller 102, which may be, for example, a computing system embodied in one or more of the network topologies described herein above.

Thus, as can be seen from the description herein above, the SCADA controller 102 and web service 400 function independently of one another so that a single parametric data database 108 may be used for storage of parametric data that is accessible by multiple users on an on-demand basis. The SCADA controller 102 continually updates the parametric data database 108 at ongoing intervals so that a relatively current version of the data is maintained. Additionally, the parametric data stored in the parametric data database 108 is protected from illicit access by allowing access only through a login session for those users having a subscription to access such data. Therefore, because multiple, independent databases are not required, a SCADA system may be realized that is easy to maintain, while maintaining a relatively high degree of performance by obviating the need to retrieve the same parametric data multiple times for each interested party that wishes to view such data.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
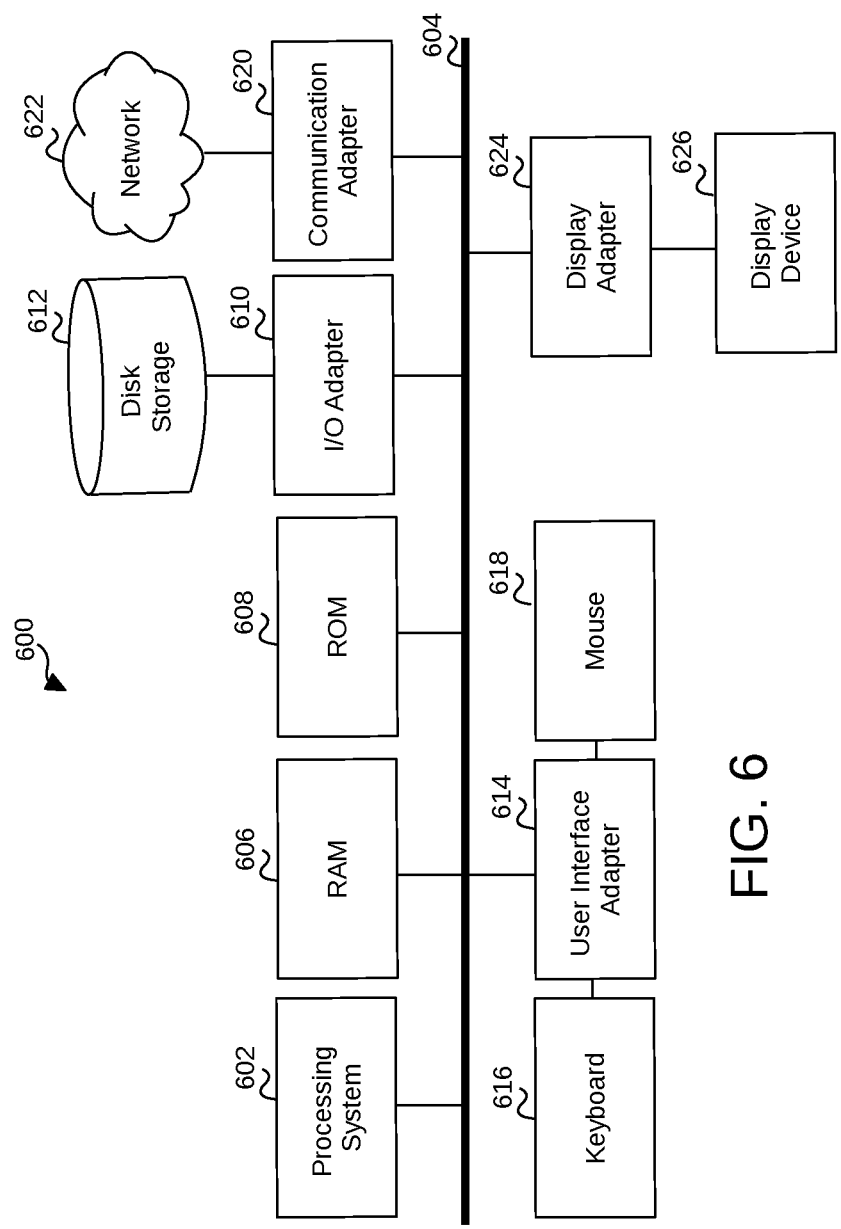
FIG. 6 illustrates an example representative hardware environment for practicing the present invention according to one embodiment of the present disclosure.

FIG. 6 illustrates an example representative hardware environment 600 for practicing the present invention according to one embodiment of the present disclosure. In particular, the representative hardware environment 600 may include certain components similar to the SCADA controller 102, and execute the SCADA control system 100 as described above. The representative hardware environment 600 includes a processing system 602, which may include one or more microprocessors, and a number of other units interconnected via a system bus 604. The processing system 602 may include other circuitry not shown herein, which may include other types of circuitry typically found in a microprocessor, such as an execution unit, bus interface unit, Arithmetic Logic Unit ("ALU"), and the like. In some cases, the processing system 602 may be embodied in a single Integrated Circuit ("IC") chip.

The representative hardware environment 600 includes a Random Access Memory ("RAM") 606 and a Read Only Memory ("ROM") 608. Also included are an I/O adapter 610 for connecting peripheral devices such as disk storage units 612 to the bus 604, a user interface adapter 614 for connecting a keyboard 616, a mouse 618 and/or other user interface devices, such as a touch screen device (not shown) to the bus 604. The I/O adapter 610 may be of any of several well-know types, including a serial interface, a parallel interface, a Universal Serial Bus ("USB") and the like.

Further included in the representative hardware environment 600 may be a communication adapter 620 for connecting the representative hardware environment 600 to a communication network 622, such as the Internet. For user interface purposes, the representative hardware environment 600 may include a display adapter 624 for connecting the system bus 604 to a display device 626. In an alternative embodiment, the representative hardware environment 600 may include additional display adapters (not shown) for connecting additional display devices (not shown) to the representative hardware environment 600.

It will be appreciated that, although many processing systems 602 may have many or all of these elements, each and every element described above is not required in order for a device to qualify as a representative hardware environment. One such device may be, for example, a Real Time Unit ("RTU"). A RTU generally includes a representative hardware environment 600 adapted to receiving sensor or other real-time, or other non-real-time data. Accordingly, the I/O adapter 610 is adapted to receive input from such sensors. However, the RTU may not have a user interface adapter 614 or any of the elements attached thereto. In some alternative embodiments, the RTU may have a user interface adapter 614, but the associated devices (keyboard 616, mouse 618, etc.) are only connected on a temporary basis, for installation, maintenance and the like. Similarly, the RTU may or may not have a disk storage unit 612, or the like.

With respect to the above description, it is to be realized that although embodiment of specific material, representations, iterations, applications, configurations, networks, and languages are disclosed, those enabling embodiments are illustrative and the optimum relationship for the parts of the invention may include variations in composition, form, protocols, function, and manner of operation, which are deemed readily apparent to one skilled in the art in view of the present disclosure. All relevant relationships to those illustrated in the drawings and the specification are intended to be encompassed by the claims of the present disclosure. Therefore, the foregoing is considered as merely illustrative of the principles of the present disclosure. Numerous modifications will readily occur to those skilled in the art. It is not desired to limit the present disclosure or the claims to the exact construction and operation shown or described, and all suitable modifications and equivalents may be resorted to, falling within the scope of the present disclosure.

What is claimed is:

1. A supervisory control and data acquisition (SCADA) system comprising:
   an input/output (I/O) management system in communication with a SCADA application and a plurality of SCADA devices, the I/O management system stored in at least one memory and executed by at least one processing system to:
   receive a plurality of request messages from the SCADA application, each of the plurality of request messages associated with corresponding ones of the plurality of SCADA devices;
   for each of the received request messages:
     forward the request message to a device driver associated with the SCADA device, wherein the device driver is configured to communicate with the SCADA device according to a protocol of the SCADA device;
     establish an asynchronous connection for communicating with the SCADA device, the asynchronous connection established using executable instructions stored in the at least one memory at a location that is separate and distinct from where the device driver is stored;
     receive request message data associated with the request message from the device driver;
     transmit the request message data to the SCADA device through the asynchronous connection;
     when response message data is received from the SCADA device, forward the response message data to the device driver, the device driver configured to generate a response message using the response message data, wherein the response message is associated with the request message; and
     when the generated response message is received from the device driver, forward the response message to the SCADA application,
     wherein the request message data is transmitted independently of when the request message data associated with each of the other request messages are transmitted.

2. The SCADA system of claim 1, wherein the I/O management system is further executed to setup the asynchronous connection according to contextual information associated with the SCADA device, wherein the contextual information comprises unique information for communicating with the SCADA device.

3. The SCADA system of claim 2, wherein the contextual information is stored in a record that is separate and distinct from the device driver.

4. The SCADA system of claim 2, wherein the contextual information comprises at least one of a unique (ID) identifier associated with the SCADA device, a particular device driver associated with the SCADA device, an address associated with the SCADA device, an address port associated with the SCADA device, a maximum quantity of message attempt values, a delay time between message attempts value, and a maximum session length value.

5. The SCADA system of claim 1, wherein the device driver is associated with the SCADA device according to a protocol type of the SCADA device.

6. The SCADA system of claim 5, wherein the protocol type comprises at least one of a modbus RTU protocol, a modbus ASCII protocol, an Ethernet Industrial Process protocol, an Enron Modbus protocol, a Scadapack Modbus protocol, a Bristol BSAP protocol, a Totalflow Native protocol, an Emerson ROC protocol, a Kimray DACC protocol, a serial RS232 protocol, a serial RS485 protocol, a Serial Radio protocol, a Ethernet TCP/IP protocol, a Cellular TCP/IP protocol, an Amoco Hex Repeater protocol, a Ferguson Beauregard FBNet protocol, a Totalflow Remote protocol, a Modbus Enron protocol, a Modbus SCADApack protocol, a Modbus Lufkin protocol, and a Modbus TCP protocol.

7. The SCADA system of claim 1, wherein the asynchronous connection comprises an Internet socket with a socket descriptor, the I/O management system is further configured to communicate with a certain SCADA device of the plurality of SCADA devices according to the socket descriptor associated with the SCADA device.

8. The SCADA system of claim 1, wherein the SCADA application comprises a web service stored in the memory and executed by the processing system to process a request from a subscriber device by, receiving the request, identifying a portion of the parametric data that the subscriber device is allocated to receive, obtaining the portion of the parametric data from the first database, and transmitting the obtained portion of the parametric data to the subscriber device, wherein the web service processes the request independently of when the I/O management system receives the parametric data from the plurality of SCADA devices.

9. A method comprising:
receiving, using instructions stored in a non-transitory, computer-readable medium and executed on a processing system, a plurality of request messages each associated with corresponding ones of the plurality of supervisory control and data acquisition (SCADA) devices from a SCADA application; and
for each of the received request messages:
forwarding, using the instructions, the request message to a device driver associated with the SCADA device, wherein the device driver is configured to communicate with the SCADA device according to a protocol of the SCADA device;
establishing, using the instructions, an asynchronous connection for communicating with the SCADA device, the asynchronous connection established using executable instructions stored in the at least one memory at a location that is separate and distinct from where the device driver is stored;
receiving, using the instructions, request message data associated with the request message from the device driver;
transmitting, using the instructions, the request message data to the SCADA device through the asynchronous connection;
when response message data is received from the SCADA device, forwarding, using the instructions, the response message data to the device driver, the device driver configured to generate a response message using the response message data, wherein the response message is associated with the request message; and
when the generated response message is received from the device driver, forwarding, using the instructions, the response message to the SCADA application,
wherein the request message data is transmitted independently of when the request message data associated with each of the other request messages are transmitted.

10. The method of claim 9, further comprising setting up the asynchronous connection according to contextual information associated with the SCADA device, wherein the contextual information comprises specific information for communicating with the SCADA device.

11. The method of claim 10, wherein the contextual information is stored in a record that is separate and distinct from the device driver.

12. The method of claim 9, wherein the device driver is associated with the SCADA device according to a protocol type of the SCADA device, the protocol type comprising at least one of a modbus RTU protocol, a modbus ASCII protocol, a Ethernet Industrial Process protocol, an Enron Modbus protocol, a Scadapack Modbus protocol, a Bristol BSP protocol, a Totalflow Native protocol, an Emerson ROC protocol, a Kimray DACC protocol, a serial RS232 protocol, a serial RS485 protocol, a Serial Radio protocol, a Ethernet TCP/IP protocol, a Cellular TCP/IP protocol, an Amoco Hex Repeater protocol, a Ferguson Beauregard FBNet protocol, a Totalflow Remote protocol, a Modbus Enron protocol, a Modbus SCADApack protocol, a Modbus lufkin protocol, and a Modbus TCP protocol.

13. The method of claim 9, wherein the asynchronous connection comprises an Internet socket with a socket descriptor, the method further comprising communicating with a certain SCADA device of the plurality of SCADA devices according to the socket descriptor associated with the SCADA device.

14. The method of claim 9, further comprising
receiving, by a web service, the request;
identifying, by the web service, portion of the parametric data that the subscriber device is allocated to receive;
obtaining, by the web service, the portion of the parametric data from the first database;
transmitting, by the web service, the obtained portion of the parametric data to the subscriber device
wherein the SCADA application comprises the web service, and
wherein the web service processes the request independently of when the I/O management system receives the parametric data from the plurality of SCADA devices.

15. Code implemented in a non-transitory, computer readable medium that when executed by at least one hardware processor, is configured to perform at least the following:
receiving, from a supervisory control and data acquisition (SCADA) application, a plurality of request messages each associated with corresponding ones of the plurality of SCADA devices; and
for each of the received request messages:
forwarding the request message to a device driver associated with the SCADA device, wherein the device driver is configured to communicate with the SCADA device according to a protocol of the SCADA device;

establishing an asynchronous connection for communicating with the SCADA device, the asynchronous connection established using executable instructions stored in the at least one memory at a location that is separate and distinct from where the device driver is stored;

receiving request message data associated with the request message from the device driver;

transmitting the request message data to the SCADA device through the asynchronous connection;

when response message data is received from the SCADA device, forwarding the response message data to the device driver, the device driver configured to generate a response message using the response message data, wherein the response message is associated with the request message; and when the generated response message is received from the device driver, forwarding the response message to the SCADA application, wherein the request message data is transmitted independently of when the request message data associated with each of the other request messages are transmitted.

16. The code of claim 15, further operable to perform:

receiving, by a web service, the request;

identifying, by the web service, a portion of the parametric data that the subscriber device is allocated to receive;

obtaining, by the web service, the portion of the parametric data from the first database; and transmitting, by the web service, the obtained portion of the parametric data to the subscriber device;

wherein the web service processes the request independently of when the I/O management system receives the parametric data from the plurality of SCADA devices.

17. The code of claim 15, further operable to perform setting up the asynchronous connection according to contextual information associated with the SCADA device, wherein the contextual information comprises specific information for communicating with each SCADA device, and wherein the contextual information is stored in a record that is separate and distinct from the device driver.

* * * * *